(12) United States Patent
Beaulieu

(10) Patent No.: US 10,778,632 B1
(45) Date of Patent: Sep. 15, 2020

(54) ELECTRONIC COMMUNICATIONS WITH FLEXIBLE SHARING OPTIONS

(71) Applicant: Nicholas Kim Beaulieu, Plano, TX (US)

(72) Inventor: Nicholas Kim Beaulieu, Plano, TX (US)

(*) Notice: Subject to any disclaimer, the term of this patent is extended or adjusted under 35 U.S.C. 154(b) by 0 days.

(21) Appl. No.: 16/858,553

(22) Filed: Apr. 24, 2020

(51) Int. Cl.
*H04L 29/08* (2006.01)
*H04L 12/58* (2006.01)
*G06F 3/0481* (2013.01)

(52) U.S. Cl.
CPC .......... *H04L 51/26* (2013.01); *G06F 3/04817* (2013.01)

(58) Field of Classification Search
CPC ...................................... H04L 51/26
See application file for complete search history.

(56) References Cited

U.S. PATENT DOCUMENTS

| | | | |
|---|---|---|---|
| 10,608,975 B2* | 3/2020 | Sabet | H04L 51/20 |
| 2014/0280564 A1* | 9/2014 | Darling | H04L 51/32 |
| | | | 709/204 |
| 2018/0315084 A1* | 11/2018 | Savage | G06N 20/00 |

* cited by examiner

*Primary Examiner* — Adnan M Mirza
(74) *Attorney, Agent, or Firm* — Nicholas Kim Beaulieu

(57) ABSTRACT

An electronic communications method with flexible sharing options includes displaying a first user interface for composing an electronic message, wherein the first user interface comprises at least a first field for identifying a recipient of the electronic message, a second field for including content of the electronic message, a third field for sharing the electronic content immediately, and a fourth field for sharing the electronic content at a later time. A user input is received selecting the fourth field for sharing the electronic content at the later time, and the electronic message is sent to the recipient of the electronic message at the later time.

20 Claims, 6 Drawing Sheets

ELECTRONIC COMMUNICATIONS WITH FLEXIBLE SHARING OPTIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications are pervasive throughout society. Some forms of electronic communications include electronic mail (e-mail), text messaging, phone/voice messaging, blogging, social application communications (e.g., an INSTAGRAM social application), and website content. Generally, the content of an electronic communication is generated by a user or an artificial intelligence (AI) program, and the content is communicated to one or more recipients upon the content being completed.

SUMMARY

In one embodiment, the disclosure includes an electronic device comprising a hardware process and a non-transitory computer-readable storage medium. The non-transitory computer-readable storage medium is configured to store instructions that, when executed by the hardware processor, cause the electronic device to display a first user interface for composing an electronic message, wherein the first user interface comprises at least a first field for identifying a recipient of the electronic message, a second field for including content of the electronic message, a third field for sharing the electronic content immediately, and a fourth field for sharing the electronic content at a later time. A user input is received for selecting the fourth field for sharing the electronic content at the later time, and the electronic message is sent to the recipient of the electronic message at the later time.

In another embodiment, the disclosure includes an electronic communications method, implemented by an electronic device, the electronic communications method comprises displaying a first user interface for composing an electronic message, wherein the first user interface comprises at least a first field for identifying a recipient of the electronic message, a second field for including content of the electronic message, a third field for sharing the electronic content immediately, and a fourth field for sharing the electronic content at a later time. A user input is received for selecting the fourth field for sharing the electronic content at the later time, and the electronic message is sent to the recipient of the electronic message at the later time.

In yet another embodiment, the disclosure includes an electronic device comprising a hardware processor and a non-transitory computer-readable storage medium. The non-transitory computer-readable storage medium is configured to store instructions that, when executed by the hardware processor, cause the electronic device to display a first user interface for composing an electronic message, receive a first user input for sending the electronic message, display a second user interface prompting a user to select sending the electronic message at a current time or at a later time, receive a second user input for sending the electronic message at the later time, display a third user interface for prompting the user to input the later time, receive an indication of a time and a day associated with the later time, and send the electronic message at the time and the day associated with the later time.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, the Applicant in no way disclaims these technical aspects, and it is contemplated that the present disclosure may encompass one or more of the conventional technical aspects discussed herein.

Disclosed herein are electronic devices and processes for enabling flexible sharing of electronic communications. Electronic devices and processes commonly do not provide options for when generated content is shared. For instance, in other approaches, an e-mail is written and is immediately sent by selecting a send button. However, in embodiments of the present disclosure, additional sharing options are provided. The additional sharing options include a time when an electronic communication is shared (e.g., when an e-mail or a direct message is sent to a recipient). Embodiments of the present disclosure are applied to any type of electronic communication such as, but not limited to, e-mail, direct messaging, text messaging, phone/voice messaging, blogging, social application communications, and website content. Accordingly, a content generator does not need to immediately share generated content. Instead, the content generator has flexible sharing options for when the content is shared. This could be useful, for instance, when a user does not want to disturb a recipient at a certain time or when a user wants to target sharing of content at a strategic time (e.g., an advertiser may want to wait to shortly before a sale before advertising the sale).

Figure 1:
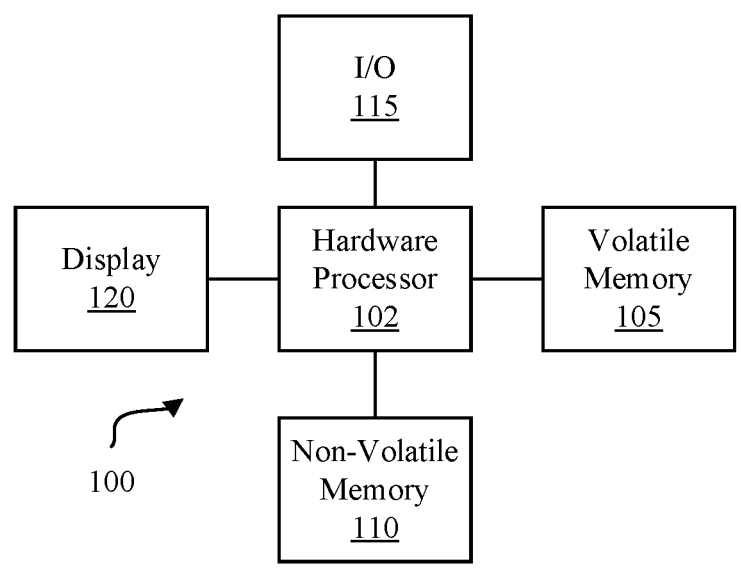
FIG. 1 is a schematic diagram of an electronic device.

FIG. 1 is a schematic diagram of an electronic device 100 that is configured to implement the flexible sharing options described herein. Electronic device 102 includes a hardware processor 102 for executing computer-executable instructions that operate the rest of the components of the electronic device 100. The hardware processor 100 is communicatively coupled to a volatile memory 105, a non-volatile memory 110 which may include a non-transitory computer-readable storage medium for storing the computer-executable instructions, input/output devices 115 (e.g., keyboards, touchscreens, speakers, microphones, biometric sensors, mice, motion sensors, etc.), and a display 120 that is optionally a touchscreen display or a non-touch display. The electronic device 100 may have more or fewer components than is shown in FIG. 1. Additionally, the electronic device 100 can have any form factor. The electronic device is a smart watch, a portable computer, a tablet computer, a server, a desktop computer, a mobile phone, or any other type of electronic device with electronic communications capabilities.

Figure 2:
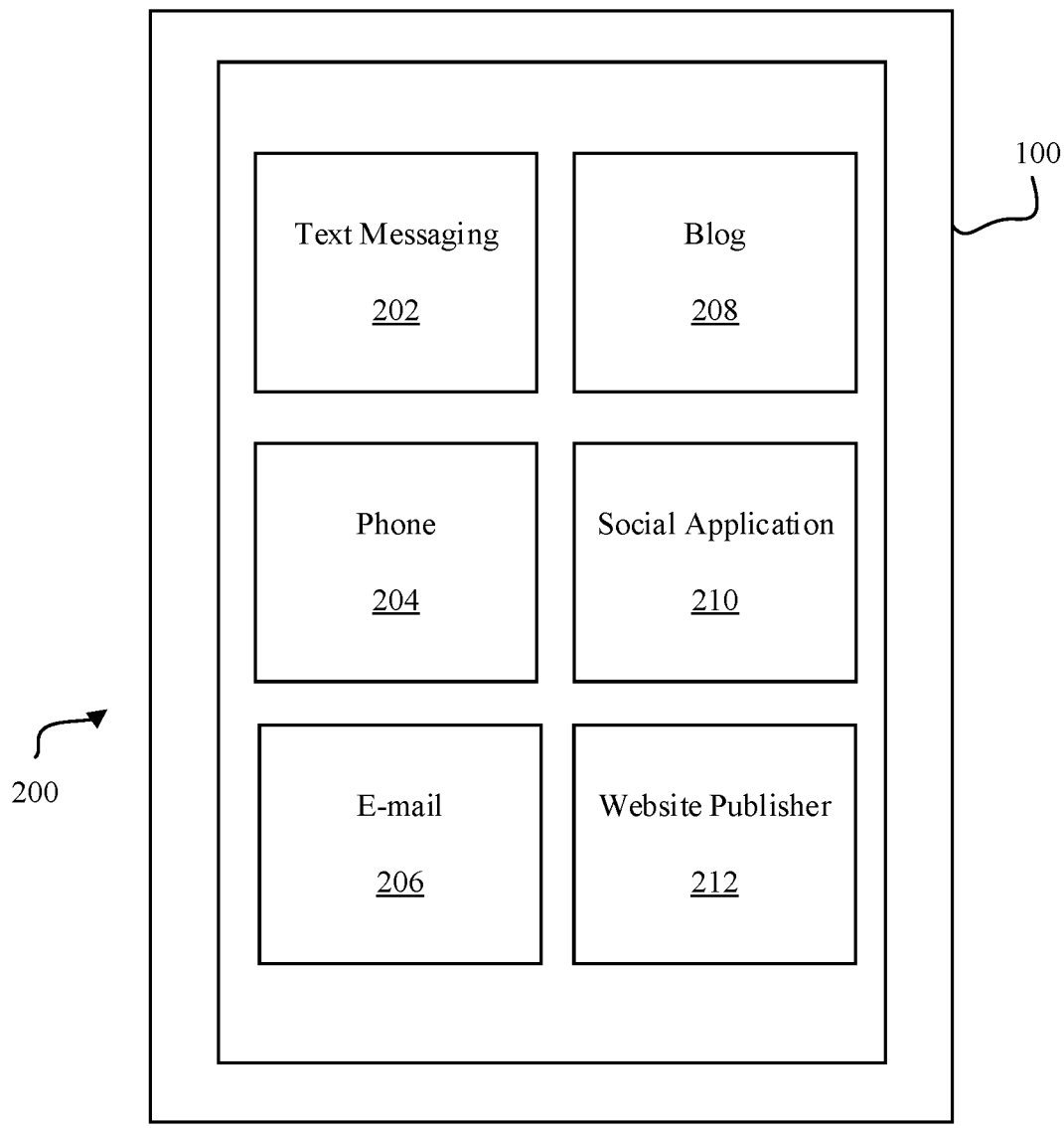
FIG. 2 is schematic diagram of a user interface of the electronic device having a plurality of application icons.

FIG. 2 is schematic diagram of a user interface 200 of the electronic device 100. The user interface 200 includes user selectable icons for launching electronic communications programs. For instance, the electronic device 100 has an icon 202 that corresponds to a text messaging application, an icon 204 that corresponds to a phone/voice messaging application, an icon 206 that corresponds to an e-mail application, an icon 208 that corresponds to a blog application, an icon 210 that corresponds to a social application, and an icon 212 that corresponds to a website publishing application. Embodiments of electronic device 100 are not however limited to having any particular applications and can have more or few applications than what is shown in FIG. 2.

Figure 3:
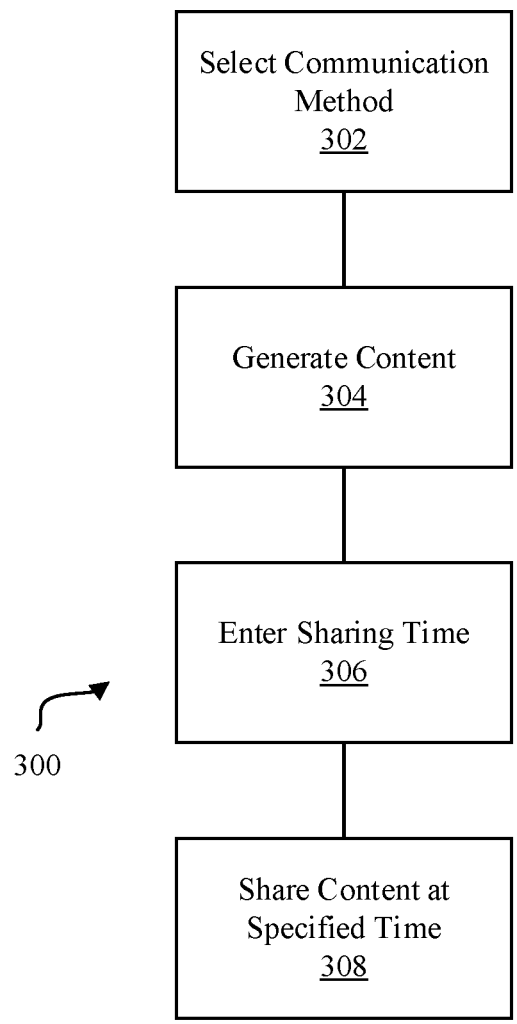
FIG. 3 is a flowchart of a process that provides flexible electronic communications sharing options.

FIG. 3 is a flowchart of an embodiment of an electronic process 300 implemented by electronic device 100 that provides flexible electronic communications sharing options. At block 302, a user or an AI application selects one or more electronic communications methods (e.g., text messaging, direct messaging, phone/voice, e-mail, blog, social application, website publisher, etc.). At block 304, the user or AI application generates content of an electronic message (e.g., text or voice content). At block 306, the user or AI application enters a sharing time for the electronic message. For instance, a time for delivering an e-mail, text, or voice message is entered, or a time for posting content to a blog, social application, website, electronic sign, display board, etc. is entered. At block 308, the electronic communication is shared (e.g., sent, posted, delivered, displayed, etc.).

Figure 4:
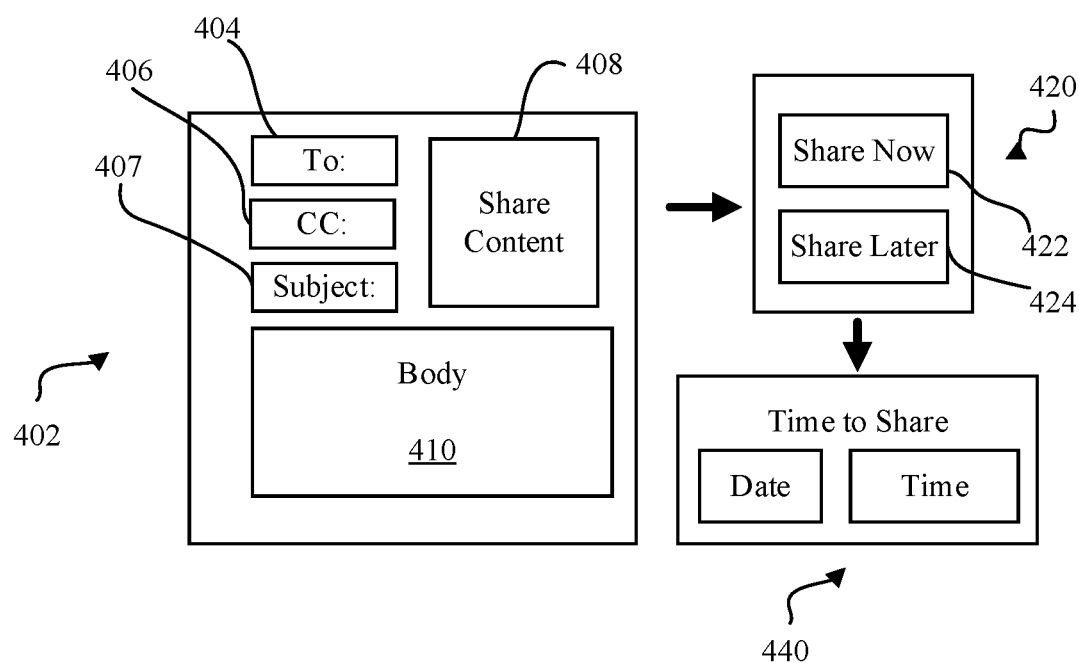
FIG. 4 is schematic diagram of user interfaces of an electronic communication application having flexible sharing options.

FIG. 4 is schematic diagram of user interfaces that implement an embodiment of the present disclosure. User interface 402 is an interface in an electronic communications application that is used to generate content. User interface 402 has a "to" box 404, a "cc" box 406, a "subject" section 407, a "share" button 408, and a "body" section 410. The "to" box 404 and the "cc" box 406 are used to input or select one or more recipients or groups to receive the shared content. The "subject" section 407 is used to enter a subject or title of the electronic communication. The "share" button 408 is used to share the content. In certain embodiments, the "share" button 408 may be a send button, a post button, an upload button, a publishing button, etc. The "body" section 410 is used to hold the content of the electronic message. For instance, the content of the electronic message may be an e-mail message, text, voice, pictures, videos, music, or any other shareable content.

In an embodiment, once the "share" button 408 is selected, user interface 420 is displayed. The user interface 420 illustratively has two options. One option is to "share now" 422, and the other option is to "share later" 424. If "share now" 422 is selected, the electronic content is shared at the current time. For example, an e-mail is sent to a recipient at the present time, a text message is sent to a recipient at the present time, a website is published at the present time, etc. If "share later" 424 is selected, the electronic content is not immediately shared. Instead the user interface 440 is displayed. User interface 440 is used to indicate a time in the future in which the electronic content is to be shared. User interface 440 is configured to receive an indication of a time and a date to which to share the electronic content. Alternatively, the user interface 440 may receive a schedule of re-occurring times and dates to share the electronic content. For example, a user may compose an e-mail message to send to a supervisor, customer, etc. late at night. The user may not want to disrupt the recipient at the give time, so the user can specify a day (e.g., tomorrow) and a time (e.g., 9:00 a.m.) for sending the e-mail message. Accordingly, the user is able to complete an electronic communication at any time of the day and have it delivered at a specified time in the future.

It should be noted that this method applies to all electronic communication methods. For instance, a user may send a text message at a later time, send a phone/voice message at a later time, send an e-mail at a later time, post a blog at a later time, post to a social application at a later time, comment on a social application at a later time, publish a website at a later time, or post electronic advertising at a later time. This provides flexibility in sharing options for electronic communications.

Figure 5:
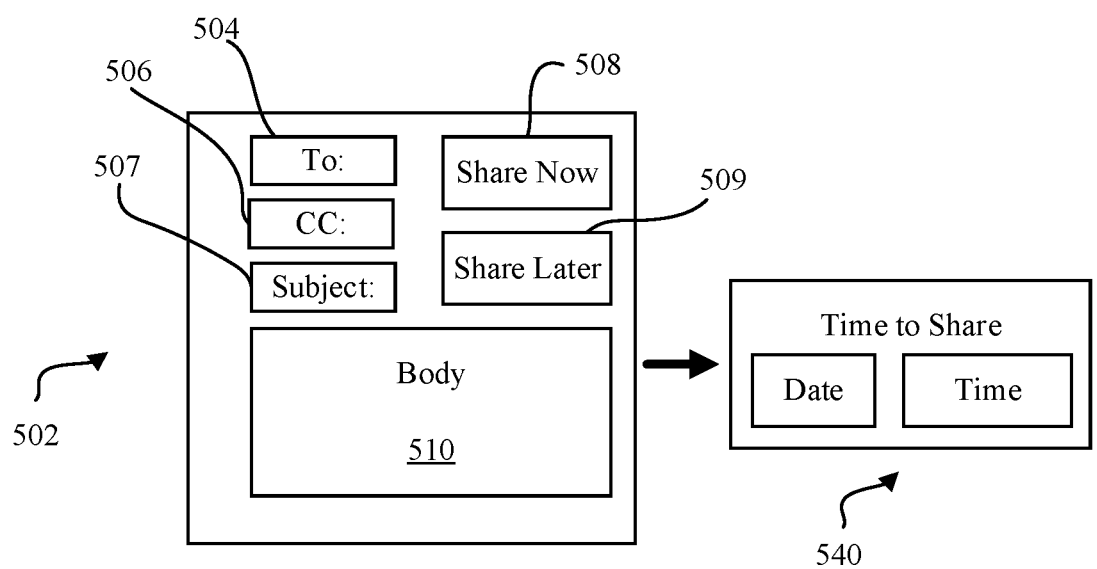
FIG. 5 is schematic diagram of additional user interfaces of an electronic communication application having flexible sharing options.

FIG. 5 is schematic diagram of user interfaces that implement another embodiment of the present disclosure. User interface 502 is an interface in an electronic communications application that is used to generate content. User interface 502 has a "to" box 504, a "cc" box 506, a "subject" section 507, a "share now" button 508, a "share later" button 508, and a "body" section 510. The "to" box 504, the "cc" box 506, the "subject" section 507, and the "body" section 510 operate similarly to the corresponding components of user interface 402 in FIG. 4 described above. The "share now" button 508 illustratively causes the electronic communication to be shared at the current time. If the "share later" button 509 is selected, the electronic communication is not immediately shared. Instead, the user interface 540 is displayed. User interface 540 is used to indicate a time in the future in which the electronic content is to be shared. User interface 540 is configured to receive an indication of a time and a date to which to share the electronic content. Alternatively, the user interface 540 may receive a schedule of re-occurring times and dates to share the electronic content.

Figure 6:
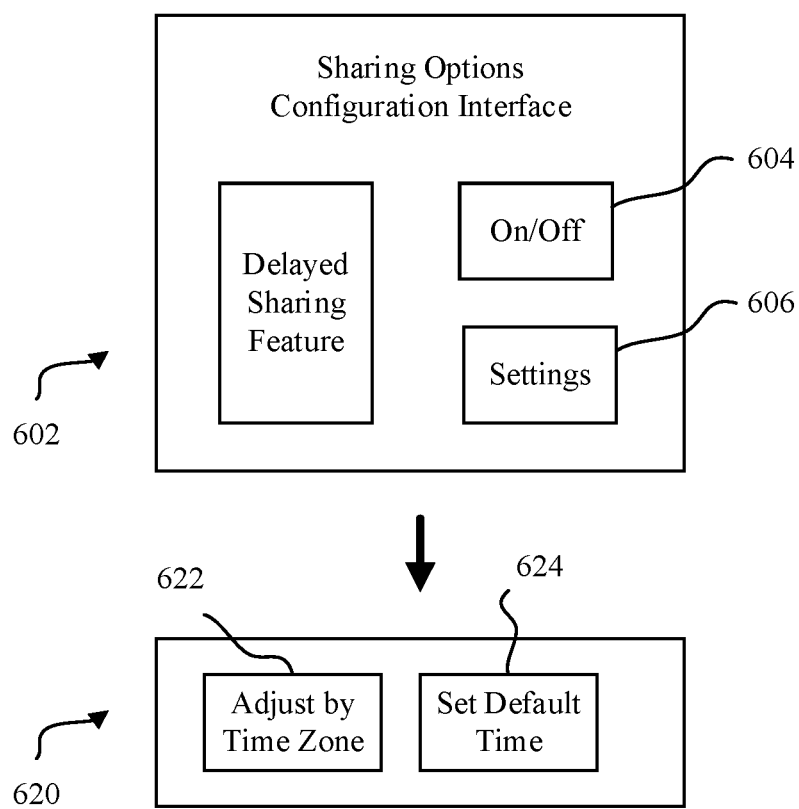
FIG. 6 is schematic diagram of user interfaces that allow for flexible sharing options to be configured.

FIG. 6 is schematic diagram of user interfaces that implement yet another embodiment of the present disclosure. FIG. 6 includes an electronic communications setting user interface 602 that comprises options for setting-up or configuring sharing options of an electronic communications application. User interface 602 includes a selection box 604 for turning delayed sharing features on and off for a particular application on an electronic device or for all applications on the electronic device. User interface 602 further includes a settings button 606. Selection of settings button 606 causes an additional user interface 620 to be displayed. Additional user interface 620 allows for different options to be set. For instance, an option for adjusting sharing time zones by time zone of a recipient, an option for setting a default time for sharing an electronic communication (e.g., a morning of a next workday such as 8 a.m. or 9 a.m. on the next Monday, Tuesday, Wednesday, Thursday, or Friday in the U.S.), or any other options that may be desirable to be set.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An electronic device comprising:
   a hardware processor; and
   a non-transitory computer-readable storage medium coupled to the hardware processor and configured to store instructions and a plurality of electronic communications applications, wherein when executed by the hardware processor, the instructions cause the electronic device to:
   display a first user interface for composing an electronic message, wherein the first user interface comprises at least a first field for identifying a recipient of the electronic message, a second field for including electronic content of the electronic message, a third field for sharing the electronic content immediately, and a fourth field for sharing the electronic content at a later time;
   receive a user input selecting the fourth field for sharing the electronic content at the later time;
   send the electronic message to the recipient of the electronic message at the later time, wherein the later time includes a day and a time in the future;
   display the plurality of electronic communications applications on a second user interface, wherein the plurality of electronic communications applications comprises a text messaging application, a phone/voice messaging application, an electronic mail (e-mail) application, a blog application, a social application, and a website publishing application, and wherein the second user interface comprises options for adjusting a sharing time according to a time zone associated with the recipient and setting a default time for sharing the electronic message; and
   receive a second user input selecting one of the plurality of electronic communications applications, and
   wherein the electronic message is sent to the recipient of the electronic message at the later time comprises sending the electronic message to the recipient using the one of the plurality of electronic communications applications.

2. The electronic device of claim 1, wherein the second user interface is configured to allow a user to specify the later time.

3. The electronic device of claim 1, wherein the instructions further cause the electronic device the second user interface to allow a user to specify sharing options for one or more of the plurality of electronic communications applications.

4. The electronic device of claim 1, wherein the default time for sharing the electronic message comprises sharing the electronic message in a morning of a next work day.

5. An electronic communications method, implemented by an electronic device, the electronic communications method comprising:
   displaying a first user interface for composing an electronic message, wherein the first user interface comprises at least a first field for identifying a recipient of the electronic message, a second field for including electronic content of the electronic message, a third field for sharing the electronic content immediately, and a fourth field for sharing the electronic content at a later time;

receiving a user input selecting the fourth field for sharing the electronic content at the later time;

sending the electronic message to the recipient of the electronic message at the later time, wherein the later time includes a day and a time in the future;

displaying a plurality of electronic communications applications on a second user interface, wherein the plurality of electronic communications applications comprises a text messaging application, a phone/voice messaging application, an electronic mail (e-mail) application, a blog application, a social application, and a website publishing application, and wherein the second user interface comprises options for adjusting a sharing time according to a time zone associated with the recipient and setting a default time for sharing the electronic message; and receive a second user input selecting one of the plurality of electronic communications applications, and wherein the electronic message is sent to the recipient of the electronic message at the later time comprises sending the electronic message to the recipient using the one of the plurality of electronic communications applications.

6. The electronic communications method of claim 5, further comprising receiving a third user input for sharing the electronic message in a morning of a next work day.

7. An electronic device comprising:

a hardware processor; and a non-transitory computer-readable storage medium coupled to the hardware processor and configured to store instructions and a plurality of electronic communications applications, wherein when executed by the hardware processor, the instructions cause the electronic device to:

display a first user interface for composing an electronic message;

receive a first user input for sending the electronic message;

display a second user interface prompting a user to select sending the electronic message at a current time or at a later time;

receive a second user input for sending the electronic message at the later time;

display a third user interface for prompting the user to input the later time, wherein the later time includes a day and a time in the future, and wherein the third user interface comprises options for adjusting a sharing time according to a time zone associated with a recipient and setting a default time for sharing the electronic message;

receive an indication of the day and the time in the future;

send the electronic message at the day and the time in the future;

display the plurality of electronic communications applications on a fourth user interface, wherein the plurality of electronic communications applications comprises a text messaging application, a phone/voice messaging application, an electronic mail (e-mail) application, a blog application, a social application, and a website publishing application; and receive a third user input selecting one of the plurality of electronic communications applications, and wherein the electronic message is sent to the recipient of the electronic message at the later time comprises sending the electronic message to the recipient using the one of the plurality of electronic communications applications.

8. The electronic device of claim 7, wherein the default time for sharing the electronic message comprises a morning of a next work day.

9. The electronic device of claim 7, wherein the default time is set in advance by the user in an options setting user interface.

10. The electronic device of claim 9, wherein the default time is applied to all of the electronic communications applications installed on the electronic device.

11. The electronic device of claim 9, wherein the default time is applied to a portion of the electronic communications applications installed on the electronic device.

12. The electronic device of claim 7, wherein the electronic message comprises a text message.

13. The electronic device of claim 7, wherein the electronic message comprises a social application message.

14. The electronic device of claim 7, wherein the electronic message comprises an electronic mail message.

15. The electronic device of claim 7, wherein the electronic message comprises an advertising message that is sent to a plurality of recipients.

16. The electronic device of claim 1, wherein the one of the plurality of electronic communications applications comprises an INSTAGRAM social application.

17. The electronic device of claim 1, wherein the electronic content of the electronic message is from a user.

18. The electronic device of claim 1, wherein the electronic content of the electronic message is from an Artificial Intelligence (AI) program.

19. The electronic communications method of claim 5, wherein the one of the plurality of electronic communications applications comprises an INSTAGRAM social application.

20. The electronic device of claim 7, wherein the one of the plurality of electronic communications applications comprises an INSTAGRAM social application.

* * * * *